United States Patent [19]

Moorhead et al.

[11] Patent Number: 4,717,956
[45] Date of Patent: Jan. 5, 1988

[54] IMAGE-SEQUENCE COMPRESSION USING A MOTION-COMPENSATION TECHNIQUE

[75] Inventors: Robert J. Moorhead, Mahopac, N.Y.; Sarah A. Rajala, Raleigh, N.C.

[73] Assignee: North Carolina State University, Raleigh, N.C.

[21] Appl. No.: 767,471

[22] Filed: Aug. 20, 1985

[51] Int. Cl.⁴ .......................... H04N 7/12; H04N 7/18
[52] U.S. Cl. .................................. 358/135; 358/138; 358/105
[58] Field of Search ............... 358/105, 135, 136, 138; 375/27

[56] References Cited

U.S. PATENT DOCUMENTS

| | | |
|---|---|---|
| 3,632,865 | 1/1972 | Haskell et al. ...................... 358/136 |
| 3,890,462 | 6/1975 | Limb et al. . |
| 4,218,703 | 8/1980 | Netravali et al. . |
| 4,218,704 | 8/1980 | Netravali et al. . |
| 4,270,143 | 5/1981 | Morris .......................... 358/105 X |
| 4,278,996 | 7/1981 | Netravali et al. . |
| 4,307,420 | 12/1981 | Ninomiya et al. . |
| 4,371,895 | 2/1983 | Koga . |
| 4,383,272 | 5/1983 | Netravali et al. . |
| 4,386,366 | 5/1983 | Mori . |
| 4,394,774 | 7/1983 | Widergren et al. . |
| 4,437,119 | 3/1984 | Matsumoto et al. . |
| 4,454,546 | 6/1984 | Mori . |
| 4,460,923 | 7/1984 | Hirano et al. . |
| 4,470,072 | 9/1984 | Tanaka et al. . |
| 4,488,175 | 12/1984 | Netravali . |
| 4,575,756 | 3/1986 | Furukawa ........................... 358/136 |

OTHER PUBLICATIONS

A. N. Netravali and J. D. Robbins, "Motion-Compensated Television Coding: Part I", *The Bell System Technical Journal*, Mar. 1979, pp. 631-670.

Primary Examiner—E. A. Goldberg
Assistant Examiner—Patrick W. Foster
Attorney, Agent, or Firm—Bell, Seltzer, Park & Gibson

[57] ABSTRACT

A motion-compensated image-sequence compression technique is disclosed in which the motion of an object point in a video screen occurring between the present frame and the following frame is predicted. The technique, useful in video teleconferencing, comprises calculating an initial estimate of the displacement of the object point and recursively updating the initial displacement estimate. The step of calculating an initial displacement comprises projecting the displacement forward along the trajectory of the motion of the object point from the present frame to the following frame.

9 Claims, 4 Drawing Figures

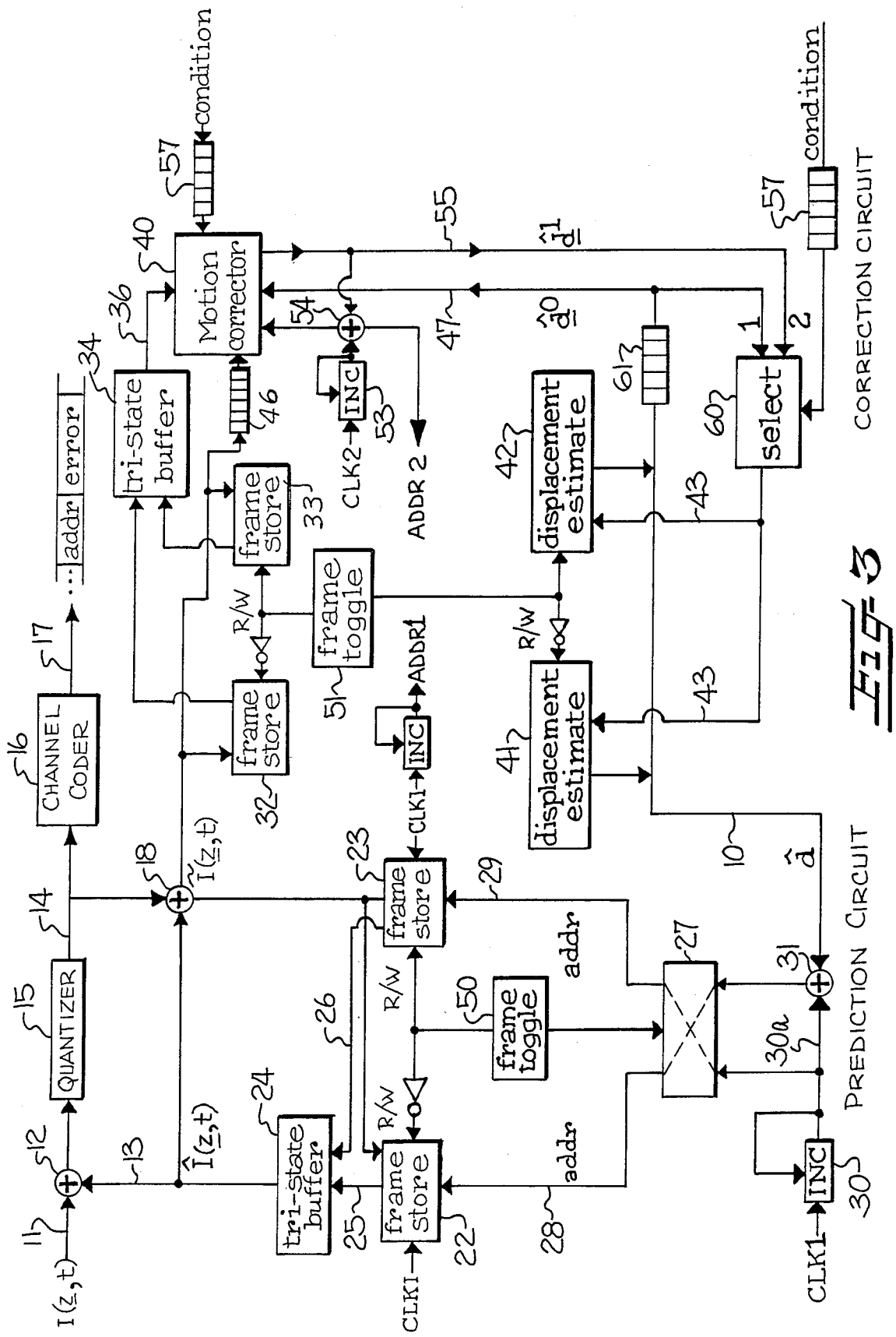

IMAGE-SEQUENCE COMPRESSION USING A MOTION-COMPENSATION TECHNIQUE

FIELD AND BACKGROUND OF THE INVENTION

This invention relates to a data compression technique which is useful in the field of video teleconferencing and more particularly to an improved motion compensated image sequence compression technique.

In video teleconferencing, one desires to obtain the best possible picture quality at the receiver and to transmit the minimum amount of information necessary to provide the picture. Thus, there exists a tradeoff between picture quality and signal bandwidth. A number of approaches aimed at reducing the amount of information which must be transmitted have been developed. Among the most well known of these data compression methods or techniques are the spatial domain techniques, the transform domain techniques and the motion compensated techniques.

Spatial domain techniques are those which exploit the inherent spatial redundancy in television images to predict the intensity of a picture element based upon the intensity of previously transmitted picture elements. These were the first approaches to image compression, and many of the algorithms were subsequently prototyped in hardware.

Video teleconferencing algorithms which utilize linear transformations such as the Fourier, Hadamard, slant, or cosine are known as transform domain techniques. These transforms differ in the amount of data compression and computational complexity. However, they all pack most of the signal energy into a few coefficients which allows more data compression with less picture quality degradation than with spatial domain coders. However, as great as the data compression of these algorithms is, equally as great is the difficulty of implementing them in real-time as shown by the paucity of existing hardware.

Motion-compensation techniques predict the frame-to-frame (or field-to-field) motion of a pixel (picture element) and then access the intensity values from the previous frame (or field). The assumption is that predicting the motion and accessing the intensity values from the previous frame (or field) results in a better prediction of the intensity values than trying to predict the intensity values directly. It has been shown that in general motion-compensation techniques improve the predictions of the intensity values in the images.

There have been two basic approaches to motion compensation: block-matching and pel-recursion. In block-matching a block of intensity values in a frame is compared with blocks of intensity values in the previous frame until a best-match is determined. From this an interframe displacement vector (how much the block has moved between frames) for the whole block can be estimated for the frame being transmitted. Poor estimates result if all pixels in the block do not move the same way. Using a pel-recursive approach on the other hand, a displacement is determined for each pel value. This technique allows for a more exact estimation of the intensity value and has the ability to handle scale changes (zooming, movement perpendicular to the image plane).

In both block-matching and pel-recursion the prediction can be backward or forward, i.e., the displacement can be determined from previously transmitted information only (backward) or from past values and the current value (forward). Forward prediction requires explicit transmission of information about the displacement value; while backward, on the other hand, does not. The advantage of the forward prediction technique is that the presumably better estimate of the displacement vector reduces the error in the intensity prediction. The majority of the previously developed approaches have used backward prediction which yields the benefits of reduced bit rates, lower computational requirements and faster prediction/estimation techniques.

Although motion-compensation techniques have existed for over 10 years, there is significant room for improvement. It is an object of the present invention to provide an improved motion prediction technique in which the total prediction error is decreased and the resulting picture quality is thus improved.

The video image is comprised of a series of images which appear in sequence on a display device, such as a cathode ray tube (CRT). The instantaneous image, at any given point in time or "frame" is a matrix of picture elements (pels). A matrix containing 262,144 pels is typical. The goal in motion prediction techniques, including the particular technique to be presently described, is to predict which pel intensity values will change in the next frame by an amount greater than a fixed predetermined threshold amount, to determine what that intensity value will be, and to transmit only the predicted difference to the receiving end. This is generally accomplished by recursive updating techniques on a pel-by-pel basis.

The basic pel-recursive technique and algorithm for estimating the displacement of a moving object in an image sequence are described in A. N. Netravali and J. D. Robbins, "Motion Compensated Television Coding, Part I," BSTJ, Vol. 58, No. 3, pp. 631–670 March 1979 and representative systems employing this technique and algorithm are described in U.S. Pat. Nos. 4,218,703; 4,218,704 and 4,278,996.

In the development of the basic pel-recursive displacement estimation technique, the intensity values within a frame are represented by $I(z,t)$, where z is a two-dimensional spatial vector and t is the frame at time t. If an object moves with purely translational motion, then for some d, where d is the two-dimensional spatial translation displacement vector of the object point during the time interval $[t-1,t]$, $$I(z,t) = I(z-d, t-1).$$

A function called the displaced frame difference (DFD) may be defined as follows:

$$DFD(z, \hat{d}^i) = I(z,t) - I(z-\hat{d}^i, t-1),$$

where $\hat{d}^i$ is an estimate of the displacement vector. The DFD converges to zero as $\hat{d}^i$ converges to the actual displacement, d, of the object point. Thus what is sought is an iterative algorithm of the form $$\hat{d}^{i+1} = \hat{d}^i + \text{update term},$$

where for each step, the update term seeks to improve the estimate of d. The ultimate goal is minimization of the magnitude of the prediction error, DFD. This can be accomplished by minimization techniques such as a steepest descent or gradient method.

The basic pel-recursive motion compensated prediction technique generally consists of the following sequence of operations or steps:

(1) calculating an initial displacement estimate $\hat{d}^0$ of an object point at the current pel, (2) generating a predicted intensity value $\hat{I}(z,t)$ for the object point at the current pel by accessing the intensity value of the object point at a displaced location in the previous frame $I(z-\hat{d}^0, t-1)$, (3) calculating the difference between the actual intensity of the object point at the current pel and said predicted intensity, and (4) correcting the initial displacement estimate of the object point at the current pel, if necessary.

With regard to step 1, there have been two predominant methods of displacement estimation: spatial and temporal. Most systems, such as the Netravali and Robbins technique described in the aforementioned publication and patents for example, use a spatially adjacent displacement vector as an initial estimate. Others predict the displacement along the temporal axis. The present invention uses a third approach: project the displacement estimation forward along the motion trajectory (PAMT). This would require a minimal increase in computation and memory over the temporal projection procedure.

SUMMARY OF THE INVENTION

The present invention thus resides in an improvement in the motion prediction technique, and more particularly in the step of calculating an initial displacement of an object point at the current pel, and provides significant advantages and benefits over the prior art techniques. In calculating the initial displacement estimate, it is projected forward along the trajectory of motion of the object point from the present frame to the following frame. This is accomplished by utilizing the corrected displacement estimate of the object point in the present frame as an offset from the present location of the object point to thereby calculate a motion trajectory for the object point.

To better understand the present invention, it will be helpful to provide a brief discussion of the theory of operation of the presently available motion compensated prediction techniques and how they compare to the present invention.

In the presently available techniques which use a spatially adjacent displacement vector as an initial estimate for the displacement vector under consideration, an implicit assumption is made that the displacement vectors always have a high spatial correlation. This is not what the original image model developed by Netravali and Robbins implies. (See A. N. Netravali and J. D. Robbins, "Motion Compensated Television Coding, Part I," BSTJ, Vol. 58, No. 3, pp. 631-670 March 1979.) The original model assumed that an object is moving over a fixed stationary background. Although the displacement vectors are highly correlated within the moving object and in the stationary background, the displacement vectors are highly uncorrelated at the edges of that moving object. For this reason it is questionable whether a spatially adjacent displacement vector is a sufficiently accurate initial estimate to assure convergence of the displacement estimation equation. Consider a one-dimensional example.

FIG. 1 is a graph which illustrates pel intensity as function of spatial displacement at times t and t−1 as represented by FIGS. 1A and 1B, respectively. An edge has moved three units to the left between frame t−1 shown in FIG. 1B and frame t shown in FIG. 1A. Scanning from left to right in frame t (FIG. 1A), a non-zero displaced frame difference (DFD) is first encountered at point $x_a$ (assume $\hat{d}^0=0$, where $\hat{d}^0=$the initial estimate of displacement). This incorrect displacement estimate of 0 will not be corrected since the spatial gradient at the selected object point in the previous frame is equal to zero. No matter how many times the algorithm iterates at $x_a$, the correct displacement value cannot be found for $I(x_a,t)$. It is not until point $x_b$ is reached that the motion estimation can be corrected (i.e., when the spatial gradient as evaluated in the previous frame becomes nonzero). If the correct d has not been determined by the time $x_d$ is reached in the scan line, $\hat{d}$ (estimate of displacement) cannot be corrected further until the spatial gradient in frame t−1 becomes nonzero again, which may not occur until much later in the scan line.

Other schemes use the temporally adjacent displacement vector as an initial estimate. By projecting the displacement vector estimates over time rather than space, the displacement estimates at the edges can exhibit a sharp discontinuity and this discontinuity can be sharpened over time. However, this approach does not fully solve the problem. It assumes that the location of the moving objects remain the same frame-to-frame.

As one example of the problem with temporal prediction, look again at FIG. 1. The same problem exists here as with spatially adjacent estimation: $\hat{d}^0=0$ at $x_a$. There is no way to converge to d at $x_a$. The improvement of temporal prediction occurs at $x_b$ where $\hat{d}^0$ is not necessarily zero. The cost of obtaining this improvement over spatial prediction is an extra frame buffer to store the $\hat{d}^0$ from frame to frame.

As a second illustration, consider the object moving to the left in the plane of view with a constant translational velocity in FIG. 2. If the displacement vectors are projected forward parallel to the temporal axis, then there will be errors associated with both the leading and the trailing edge. The intensities along the leading edge (area L in FIG. 2) will not be predicted correctly since in the previous frame (at time t−1), nothing was moving in those pixel locations into which the leading edge has now moved. The trailing edge (area T in FIG. 2), on the other hand, has left some pixel locations between time t−1 and t. The intensities at these pixel locations at time t constitute newly uncovered background. The algorithm will try to predict the intensities for these pixels from displaced intensities in the previous frame. The accuracy of this prediction will depend on the correlation between the intensity values in the displaced region in the previous frame (frame t−1) and the intensity values in the newly uncovered background region in the present frame (frame t).

A better prediction scheme would be to assume the motion, not the object location, remained the same. Instead of projecting the motion estimations forward parallel to the temporal axis, they are projected forward along the motion trajectory in accordance with the present invention.

By projecting the motion vectors forward in the direction of motion, a problem that has existed in the implementation of the algorithm is solved. In proving convergence the uncovered background was neglected. Yet most algorithms attempt to determine the intensity values for the newly uncovered background at time t using intensities in the frame at time t−1. The structure of the algorithm is at fault. By obtaining the initial estimates for the displacement vector from spatially or temporally adjacent pels there is no way to detect what regions are newly uncovered background. By predicting the motion vectors forward in the direction of motion, the uncovered background will have no displacement values predicted for it. The uncovered background is then easily detected, allowing a better predictor to be used for it and allowing the implementation to be a true implementation of the algorithm which was proved to converge.

To reiterate and summarize, by projecting the displacement estimates forward along the motion trajectory (PAMT) four improvements are obtained:

(1) As compared to spatial prediction, sharp discontinuities can exist at the boundaries between moving objects and the background.

(2) As compared to temporal prediction, the actual displacement of the object point can be found more often since the motion, not the location, of the moving area is assumed constant.

(3) The number of iterations required for convergence will be decreased due to better initial estimates.

(4) A substantial portion of the newly uncovered background is detectable and can be segmented out.

The computation requirements for PAMT prediction are only slightly greater than those for temporal prediction. The addressing for the framestore into which the motion prediction field is loaded is random; in temporal prediction it is sequential. When the rounded value of $d_x$ or of $d_y$ change, where $d_x$ and $d_y$ are the orthogonal components of the bivariate displacement estimate, a gap is left in the predicted motion vector field for the next frame when using the PAMT prediction scheme. However, this problem can be at least partially resolved by using a gap-bridging filter. As a side note, either constant interframe velocity or constant interframe acceleration can be assumed when using the PAMT prediction technique.

BRIEF DESCRIPTION OF THE DRAWINGS

Some of the features and advantages of the invention having been described, others will become apparent from the detailed description which follows, in which

FIG. 3 is an exemplary schematic of a circuit by which the motion compensated prediction technique of the present invention may be implemented.

DETAILED DESCRIPTION OF THE ILLUSTRATED EMBODIMENT

Figure 1A:
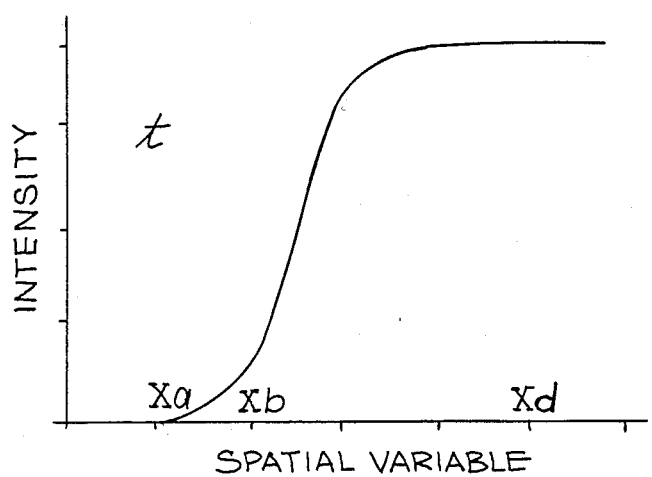
FIGS. 1A and 1B are graphs which illustrate pel intensity as a function of spatial displacement at times t and t−1, respectively.
Figure 1B:
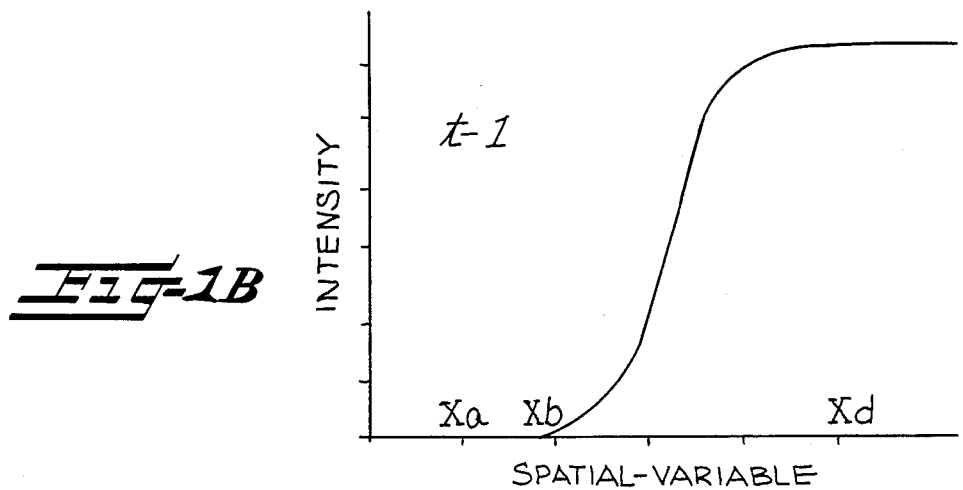
Figure 2:
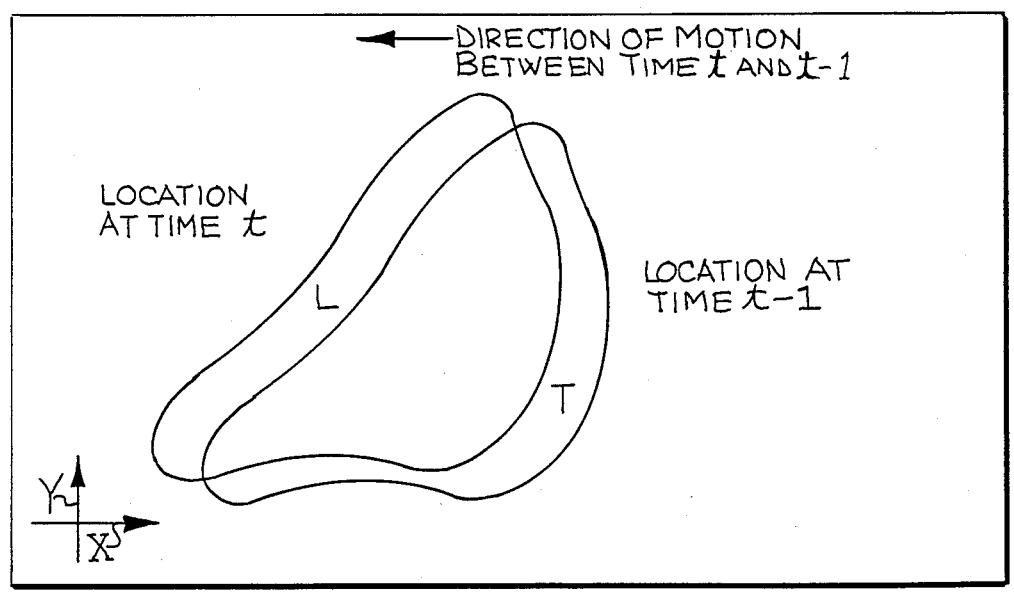
FIG. 2 is an example of a moving object on a video screen at times t and t−1; and illustrating the leading (L) and trailing (T) edges of motion.

The present invention will be described more fully hereinafter with reference to the accompanying schematic drawing of FIG. 3, in which an exemplary embodiment of a circuit for implementing the motion-compensated technique of the present invention is shown. It is to be understood at the outset however, that persons skilled in the art may modify the invention herein described while still achieving the favorable results of this invention. Accordingly, the description which follows is to be understood as a broad illustrative disclosure directed to persons of skill in the appropriate arts, and not as limiting upon the present invention.

The image sequence compression apparatus of the present invention comprises an image coder as shown in FIG. 3 placed at the transmitting end and a decoder placed at the receiving end for receiving and decoding the encoded information for use. The coder and decoder are inverses of one another, as is well known to electrical circuit designers, and therefore only the coding or transmitting end of the circuit need be described in detail.

It will be seen that the circuit illustrated in FIG. 3 includes a prediction circuit on the left side and a correction circuit on the right side. The function of the prediction circuit is to predict the intensity of an object point at the current pel by accessing the intensity value of the object point at a displaced location in the previous frame. The difference between the actual intensity and the predicted intensity is then calculated and sent to the decoder. The function of the correction circuit is to generate an initial displacement estimate of the object point at the current pel, and to correct the initial displacement estimate of the object point under certain conditions. The intensity I is a function of the spatial variable z which is comprised of two values x and y, representing the position of the pel in the frame and t, which is time, yielding $I(z,t)$. The intensity signal is input to the prediction circuit on line 11.

An adder or summing node 12 receives as its inputs the actual intensity function $\hat{I}(z,t)$ on line 11, and the predicted intensity $I(z,t)$ (obtained as hereinafter described) on line 13 and has as its output, on line 14, the difference thereof which represents the prediction error. This prediction error is fed to a quantizer 15.

Quantizer 15 is used in this circuit to round off or quantize the prediction error on line 14 and the quantized prediction error is output to a channel coder 16 which transmits to the decoder on line 17 the prediction error; along with address information in the form of a run length, which carries parameters enabling the decoder to determine the distance between the present error measure and a previous error measure.

The decoder will produce a reconstructed intensity $\tilde{I}(z,t)$ by summing the prediction error and the predicted intensity $\hat{I}(z,t)$. The reconstructed intensity $\tilde{I}(z,t)$ is also produced in the prediction circuit of FIG. 3 at adder 18 by summing the predicted intensity value $I(z,t)$ from line 13 and the quantized prediction error from line 14.

The prediction circuit includes a pair of frame stores 22, 23 which store the reconstructed intensity values for the present frame and for the previous frame. A frame toggle 50 serves to switch between the respective frame stores so that the reconstructed intensity values $\tilde{I}(z,t)$ for the present frame are written into one frame store while reconstructed intensity values for the previous frame are being read out of the other frame store.

A tri-state buffer 24 receives the intensity values from the frame stores 22 and 23. Tri-state buffers are well known in the art and are present in this system to allow active lines 25 and 26 to be hooked together such that only one of these lines is read at any given instant in time.

The frame toggle 50 serves to coordinate the read and write functions of the frame stores 22, 23 and to control which frame store is being written into and which one is being read from. The frame toggle 50 also controls the addressing of the frame stores 22, 23 through an associated crossbar switch 27. As the intensity values are written into the applicable frame store 22 or 23, the corresponding addresses are made available through crossbar switch on either of lines 28 or 29. Present frame address locations are made available by means of an incrementer 30 which is clocked by a synchronous clock CLK1.

At each pulse of CLK1, an initial displacement estimate $\hat{d}^0$ is obtained from the correction part of the circuit on line 10. An explanation of how the initial displacement estimate $\hat{d}^0$ is obtained will be given below. The initial displacement estimate $\hat{d}^0$ at line 10 and the present frame address at line 30a are summed at adder 31 to thereby obtain the address occupied by the displaced object point in the previous frame. The intensity value for the displaced object point is then retrieved from the frame store 22 or 23 for use as the prediction of intensity $\hat{I}(z,t)$ of the object point in the present frame.

Turning now to the correction circuit shown in the right hand portion of FIG. 3, it will be seen that the correction circuit also contains a pair of frame stores 32, 33 for storing reconstructed intensity values $\tilde{I}(z,t)$ received from adder 18. A tri-state buffer 34 and a frame toggle 51 are connected to the frame stores and function to control the read-write functions of the frame stores 32, 33 in the manner previously described with respect to the corresponding elements 24 and 50. As intensity values for the present frame are being written into one of the frame stores 32 or 33, intensity values from the previous frame are read from the other of the two frame stores and are input to the motion corrector 40 on line 36.

The correction circuit also includes a pair of displacement estimate stores 41, 42 for storing current and future values of the initial displacement estimate $\hat{d}^0$.

Frame toggle 51 in the correction portion of the circuit also governs the reading and writing of values of the initial displacement estimate $\hat{d}$ between displacement estimate stores 41, 42 in synchronism with the reading and writing of intensity values between frame stores 32, 33. While predicted displacement estimates $\hat{d}$ for the following frame are being written into one of displacement stores 41, 42 on line 43, predicted displacement estimates $\hat{d}$ the present frame are being read out of the other displacement store 41, 42 on line 10.

The motion corrector block, indicated at 40, has as its primary function, to correct the initial displacement estimate of the object point at the current pel if the intensity prediction error (i.e. the difference between the actual intensity and the predicted intensity) exceeds a predetermined threshold value. This correction is accomplished using the steepest descent technique. To make the correction, it is necessary to calculate the intensity gradient and the displaced frame difference (DFD) which is the difference in the intensity of the object point at the present location in the present frame and the intensity of an object point at a displaced location in the previous frams.

Six reconstructed intensity values are input into motion corrector 40 to make these calculations: five of the intensity values, henceforth A,B,C,D and E, are from the previous frame and are in a cross shape with C being in the center, and one intensity value, henceforth F, is from the present frame. Intensity values A,B,D and E are used to obtain the spatial gradient while C and F are used to obtain the displaced frame difference (DFD).

The five values from the previous frame are read from one of the frame stores 32, 33 through the tri-state buffer 34 and are supplied as input to the motion corrector on line 36. The present intensity value is directed into a queue 46 and thence to the motion corrector 40.

The motion corrector also receives as input on line 47 the initial displacement estimate $\hat{d}^0$ obtained from one of the two displacement estimate stores 41, 42.

The motion corrector 40 is governed by CLK2 and its associated incrementer 53. An adder 54 sums the current address output of incrementer 53 and the present value of $\hat{d}^1$ obtained as output from the motion corrector 40 on line 55, to obtain a displaced address for use in addressing the displacement store into which initial displacement estimater for the next frame are being written.

ADDR1 is used to address the frame store 32 or 33 into which reconstructed intensity values for the present frame $\tilde{I}(z,t)$ are being written and to address the displacement estimate store 41 or 42 from which initial displacement estimates $\hat{d}^0$ for the present frame are being read. ADDR2 is used to address the framestore 32 or 33 from which reconstructed intensity values for the previous frame $\tilde{I}(z,t-1)$ are being read and to address the displacement estimate store 41 or 42 into which initial displacement estimates for the following frame are being written.

The addition of $\hat{d}^1$ on line 55 to the value on the output on the incrementer 53 (by adder 54) to form ADDR2 accomplishes the PAMT prediction scheme. If $\hat{d}^1$ were not added to the output of incrementer 53, the circuitry would implement temporal prediction.

The operation of motion corrector 40 (i.e. whether correction of the initial displacement estimate is required), is responsive to the conditions at a condition block 57. A select block 60 is similarly responsive to condition block 57. The select block 60 receives the initial displacement estimate $\hat{d}^0$ from line 10, through a queue 61 at input 1 and the corrected displacement estimate $\hat{d}^1$ from line 55 at input 2, and selects whether the initial displacement estimate $\hat{d}^0$ or the newly calculated estimate $\hat{d}^1$ from motion corrector is written to the displacement estimate stores 41 and 42.

The conditions governing operation of the condition block 57 are as follows:

If the DFD is less than a threshold T, the $\hat{d}^0$ is selected by select block 60 as the output on line 43.

Under all other conditions, correction of the initial displacement estimate of the object point $\hat{d}^0$ at the current pel must be done in motion corrector 40 using the aforedescribed inputs according to the method.

In the present preferred embodiment, the prediction and correction parts of the circuit may operate at different rates and CLK1 and CLK2 need only toggle the same number of times within every frame, but may operate independently within a frame.

When motion correction is required, which may occur for example about 20% of the time, a corrected displacement $\hat{d}^1$ must be calculated and output on select line 2. This output serves as the input into displacement estimate stores 41, 42.

When motion correction is required, the arithmetic operations which must be performed in the motion corrector require some finite amount of time. However, when no motion correction is required, the system can operate much more quickly, since it is only necessary to copy the displacement estimate from one displacement estimate store into the other store. In this instance, the displacement estimate is read from one displacement estimate block (41 or 42), passes through a queue 61, through the select block 60, and is copied back into the other displacement estimate block (41 or 42).

To accommodate this difference in operating speed, the present invention provides for a separate clock CLK2 to control the correction part of the circuit. In prior motion compensated systems, the speed of operation of the prediction section was limited by the speed of the correction part of the circuit and in particular the motion corrector. Thus CLK2 can operate at a faster rate than CLK1 during those times when no correction is required, allowing additional computation time for those instances when motion correction must be performed in the motion corrector 40. Although the clocks pulse at different rates within a frame, each clock pulses the same number of times each frame.

That which is claimed is:

1. A method for predicting the displacement of an object point in a video scene occurring between the present frame and the following frame, said method comprising
   calculating an initial estimate of the displacement of the object point and recursively updating said initial displacement estimate, and wherein said step of calculating an initial displacement estimate comprises projecting the displacement forward along the trajectory of motion of the object point from the present frame to the following frame.

2. A method according to claim 1 wherein said step of projecting the displacement estimate forward along the trajectory of motion of the object point from the present frame to the following frame comprises utilizing the corrected displacement estimate of the object point in the present frame as an offset from the present location of the object point to thereby calculate a motion trajectory for the object point.

3. In a method of compressing visual image data comprised of a series of pels representing intensity values of object points, said method comprising the steps of
   (1) calculating an initial displacement estimate of the object point at the current pel,
   (2) generating a predicted intensity value for the object point at the current pel by accessing the intensity value of the object point at a displaced location in the previous frame,
   (3) calculating the difference between the actual intensity of the object point at the current pel and said predicted intensity, and
   (4) correcting the initial displacement estimate of the object point at the current pel,
   the improvement wherein said step (1) comprises projecting the displacement of the object point at the current pel forward along the motion trajectory of the object point.

4. In a method of compressing visual image data comprised of a series of pels representing intensity values of object points, said method comprising the steps of
   (1) calculating an initial displacement estimate of the object point at the current pel,
   (2) generating a predicted intensity value for the object point at the current pel by accessing a stored intensity value of an object point from a pel of the previous frame which is displaced from the current pel by the displacement estimate for the object point calculated in step (1),
   (3) calculating the difference between the actual intensity of the object point at the current pel and said predicted intensity value, and
   (4) correcting the initial displacement estimate for the object point at the current pel if said calculated difference exceeds a predetermined threshold value,
   the improvement wherein said step (1) of calculating an initial displacement estimate comprises projecting the displacement forward along the trajectory of motion of the object point from the present frame to the following frame.

5. A method according to claim 4 wherein said improvement further comprises performing steps (2) and (3) for each pel in a frame at a predetermined rate, and performing step (4) for the pels in the frame at a rate independent of the rate of performing steps (2) and (3).

6. An apparatus for predicting the displacement of an object point in a video scene occurring between the present frame and the following frame, said apparatus comprising means for calculating an initial estimate of the displacement of the object point and means for recursively updating the initial displacement estimate, and wherein said means for calculating an initial estimate of the displacement comprises means for projecting the displacement forward along the trajectory of motion of the object point from the present frame to the following frame.

7. Apparatus according to claim 6 wherein said means for projecting the displacement forward along the motion trajectory of the object point from the present frame to the following frame comprises means for utilizing the corrected displacement estimate of the object point in the present frame as an offset from the present location of the object point to thereby calculate the motion trajectory for the object point.

8. In an apparatus for compressing visual image data comprised of a series of pels representing the intensity values of object points, said apparatus comprising
   (1) means for calculating an initial displacement estimate of an object point at the current pel,
   (2) means for generating a predicted intensity value for the object point at the current pel by accessing a stored intensity value of an object point from a pel of the previous frame which is displaced from the current pel by the displacement estimate for the object point calculated by said means (1) above,
   (3) means for calculating the difference between the actual intensity of the object point at the current pel and said predicted intensity value, and
   (4) means for correcting the initial displacement estimate for the object point at the current pel if said difference exceeds a predetermined threshold value,
   the improvement wherein said means for calculating an initial displacement estimate comprises means for projecting the displacement forward along the trajectory of motion of the object point from the present frame to the following frame.

9. An apparatus according to claim 8 wherein the improvement further comprises
   first clock means cooperating with said means of paragraphs (2) and (3) for performing the operations thereof at a predetermined rate, and
   second clock means cooperating with said means of paragraph (4) for controlling the operation thereof, said second clock means being operable at a rate independent of the rate of said first clock means.

* * * * *

UNITED STATES PATENT AND TRADEMARK OFFICE
CERTIFICATE OF CORRECTION

PATENT NO. : 4,717,956

DATED : January 5, 1988

INVENTOR(S) : Robert J. Moorhead, et al.

It is certified that error appears in the above-identified patent and that said Letters Patent is hereby corrected as shown below:

Column 2, line 43, "I(z,t) should be -- $I(\underline{z},t)$ --

Column 2, line 43, "z" should be -- $\underline{z}$ --

Column 2, line 46, "d" (first and second occurrence) should be -- $\underline{d}$ --

Column 2, line 50, "I(z,t) = I(z-d,t-1)" should be

-- $I(\underline{z},t) = I(\underline{z}-\underline{d},t-1)$ --

Column 2, line 55, "DFD(z,$\hat{d}^i$) = I(z,t)-I(z-$\hat{d}^i$,t-1) should be

-- DFD($\underline{z},\hat{\underline{d}}^i$) = I(z,t)-I($\underline{z}-\hat{\underline{d}}^i$,t-1) --

Column 2, line 57, "$\hat{d}^i$" should be -- $\hat{\underline{d}}^i$ --

Column 2, line 58, "$\hat{d}^i$" should be -- $\hat{\underline{d}}^i$ --

Column 2, line 59, "d" should be -- $\underline{d}$ --

Column 2, line 62, "$\hat{d}^i$+1 = $\hat{d}^i$+update term" should be

-- $\hat{\underline{d}}^i+1 = \hat{\underline{d}}^i$+update term --

Column 2, line 65, "d" should be -- $\underline{d}$ --

Column 3, line 4, "$\hat{d}^0$" should be -- $\hat{\underline{d}}^0$ --

Column 3, line 6, "$\hat{I}(z,t)$" should be -- $\hat{I}(\underline{z},t)$ --

UNITED STATES PATENT AND TRADEMARK OFFICE
CERTIFICATE OF CORRECTION

PATENT NO. : 4,717,956

DATED : January 5, 1988

INVENTOR(S) : Robert J. Moorhead, et al.

It is certified that error appears in the above-identified patent and that said Letters Patent is hereby corrected as shown below:

Column 3, line 9, "$I(z-\hat{d}^0,t-1)$" should be -- $I(\underline{z}-\hat{\underline{d}}^0,t-1)$ --

Column 6, line 23, "z" should be -- $\underline{z}$ --

Column 6, line 25, "$I(z,t)$" should be -- $I(\underline{z},t)$ --

Column 6, line 28, "$\hat{I}(z,t)$" should be -- $I(\underline{z},t)$ --

Column 6, line 29, "$I(z,t)$" should be -- $\hat{I}(\underline{z},t)$ --

Column 6, line 42, "$\tilde{I}(z,t)$" should be -- $\tilde{I}(\underline{z},t)$ --

Column 6, line 43, "$\hat{I}(z,t)$" should be -- $\hat{I}(\underline{z},t)$ --

Column 6, line 43, "$\tilde{I}(z,t)$" should be $\tilde{I}(\underline{z},t)$ --

Column 6, line 45, "$I(z,t)$" should be -- $\hat{I}(\underline{z},t)$ --

Column 6, line 51, "$\hat{I}(z,t)$" should be -- $\tilde{I}(\underline{z},t)$ --

Column 7, line 6, "$\hat{d}^0$" should be -- $\hat{\underline{d}}^0$ --

Column 7, line 8, "$\hat{d}^0$" should be -- $\hat{\underline{d}}^0$ --

Column 7, line 9, "$\hat{d}^0$" should be -- $\hat{\underline{d}}^0$ --

Column 7, line 15, "$\hat{I}(z,t)$ should be -- $\hat{I}(\underline{z},t)$ --

Column 7, line 19, "$\tilde{I}(z,t)$" should be -- $\tilde{I}(\underline{z},t)$ --

UNITED STATES PATENT AND TRADEMARK OFFICE
CERTIFICATE OF CORRECTION

PATENT NO. : 4,717,956

DATED : January 5, 1988

INVENTOR(S) : Robert J. Moorhead, et al.

It is certified that error appears in the above-identified patent and that said Letters Patent is hereby corrected as shown below:

Column 7, line 32, "$\hat{d}^0$" should be -- $\underline{\hat{d}}^0$ --

Column 7, line 35, "$\hat{d}$" should be -- $\underline{\hat{d}}$ --

Column 7, line 38, "$\hat{d}$" should be -- $\underline{\hat{d}}$ --

Column 7, line 41, "$\hat{d}$" should be -- $\underline{\hat{d}}$ --

Column 7, line 41, after "$\underline{\hat{d}}$", the word -- for -- should be added Column 8, line 2, "$\hat{d}^0$" should be -- $\underline{\hat{d}}^0$ --

Column 8, line 7, "$\hat{d}^1$" should be -- $\underline{\hat{d}}^1$ --

Column 8, line 16, "$\hat{d}^0$" should be -- $\underline{\hat{d}}^0$ --

Column 8, line 23, "$\hat{d}^1$" should be -- $\underline{\hat{d}}^1$ --

Column 8, line 26, "$\hat{d}^1$" should be -- $\underline{\hat{d}}^1$ --

Column 8, line 33, "$\hat{d}^0$" should be -- $\underline{\hat{d}}^0$ --

Column 8, line 35, "$d^1$" should be -- $\underline{\hat{d}}^1$ --

Column 8, line 36, "$\hat{d}^0$" should be -- $\underline{\hat{d}}^0$ --

Column 8, line 37, "$\hat{d}^1$" should be -- $\underline{\hat{d}}^1$ --

UNITED STATES PATENT AND TRADEMARK OFFICE
CERTIFICATE OF CORRECTION

PATENT NO. : 4,717,956

DATED : January 5, 1988

INVENTOR(S) : Robert J. Moorhead, et al.

It is certified that error appears in the above-identified patent and that said Letters Patent is hereby corrected as shown below:

Column 8, line 41, "$d^0$" should be -- $\underline{d}^0$ --

Column 8, line 44, "$d^0$" should be -- $\underline{d}^0$ --

Column 8, line 54, "$\hat{d}^1$" should be -- $\underline{\hat{d}}^1$ --

Signed and Sealed this

Sixteenth Day of August, 1988

*Attest:*

DONALD J. QUIGG

*Attesting Officer*  *Commissioner of Patents and Trademarks*